US012632815B2

(12) United States Patent
Oberle et al.

(10) Patent No.: US 12,632,815 B2
(45) Date of Patent: May 19, 2026

(54) SYSTEMS AND METHODS FOR DETECTING ATTRITION IN A DISTRIBUTED NETWORK USING ARTIFICIAL INTELLIGENCE

(71) Applicant: BANK OF AMERICA CORPORATION, Charlotte, NC (US)

(72) Inventors: Michael J. Oberle, Waxhaw, NC (US); Robert M. McMillon, II, Cumming, GA (US); James Matthew West, Carrollton, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 236 days.

(21) Appl. No.: 18/376,799

(22) Filed: Oct. 4, 2023

(65) Prior Publication Data

US 2025/0117730 A1 Apr. 10, 2025

(51) Int. Cl.
| | |
|---|---|
| *G06Q 10/06* | (2023.01) |
| *G06Q 10/0637* | (2023.01) |
| *G06Q 30/015* | (2023.01) |
| *G06Q 30/0202* | (2023.01) |

(52) U.S. Cl.
CPC ..... *G06Q 10/06375* (2013.01); *G06Q 30/015* (2023.01); *G06Q 30/0202* (2013.01)

(58) Field of Classification Search
CPC ......................................... G06Q 10/00–90/00
See application file for complete search history.

(56) References Cited

U.S. PATENT DOCUMENTS

| | | | | |
|---|---|---|---|---|
| 10,262,327 | B1 * | 4/2019 | Hardebeck | G06Q 10/10 |
| 2018/0032906 | A1 * | 2/2018 | Gangadharappa | G06N 5/025 |
| 2021/0328888 | A1 * | 10/2021 | Rath | G06F 18/22 |
| 2022/0114522 | A1 * | 4/2022 | Cardoso | G06F 40/174 |
| 2023/0131099 | A1 * | 4/2023 | Anamandra | A61B 5/024 |
| | | | | 705/7.15 |
| 2024/0144188 | A1 * | 5/2024 | Folz | H04L 67/02 |

* cited by examiner

*Primary Examiner* — Arif Ullah
(74) *Attorney, Agent, or Firm* — Moore & Van Allen PLLC; R.W. McCord Rayburn

(57) ABSTRACT

Systems, computer program products, and methods are described herein for detecting attrition in a distributed network using artificial intelligence. Some embodiments are directed to a system including a first artificial intelligence engine configured to determine indicators of relationships between users and entities and a second artificial intelligence engine configured to determine statuses of relationships between the users and the entities. The system may determine, using the first artificial intelligence engine, and based on data associated with interactions between a user and an entity, a plurality of indicators of a relationship between the user and the entity. The system may determine, based on the plurality of indicators, based on the data associated with the interactions between the user and the entity, and using the second artificial intelligence engine, a status of the relationship between the user and the entity.

20 Claims, 6 Drawing Sheets

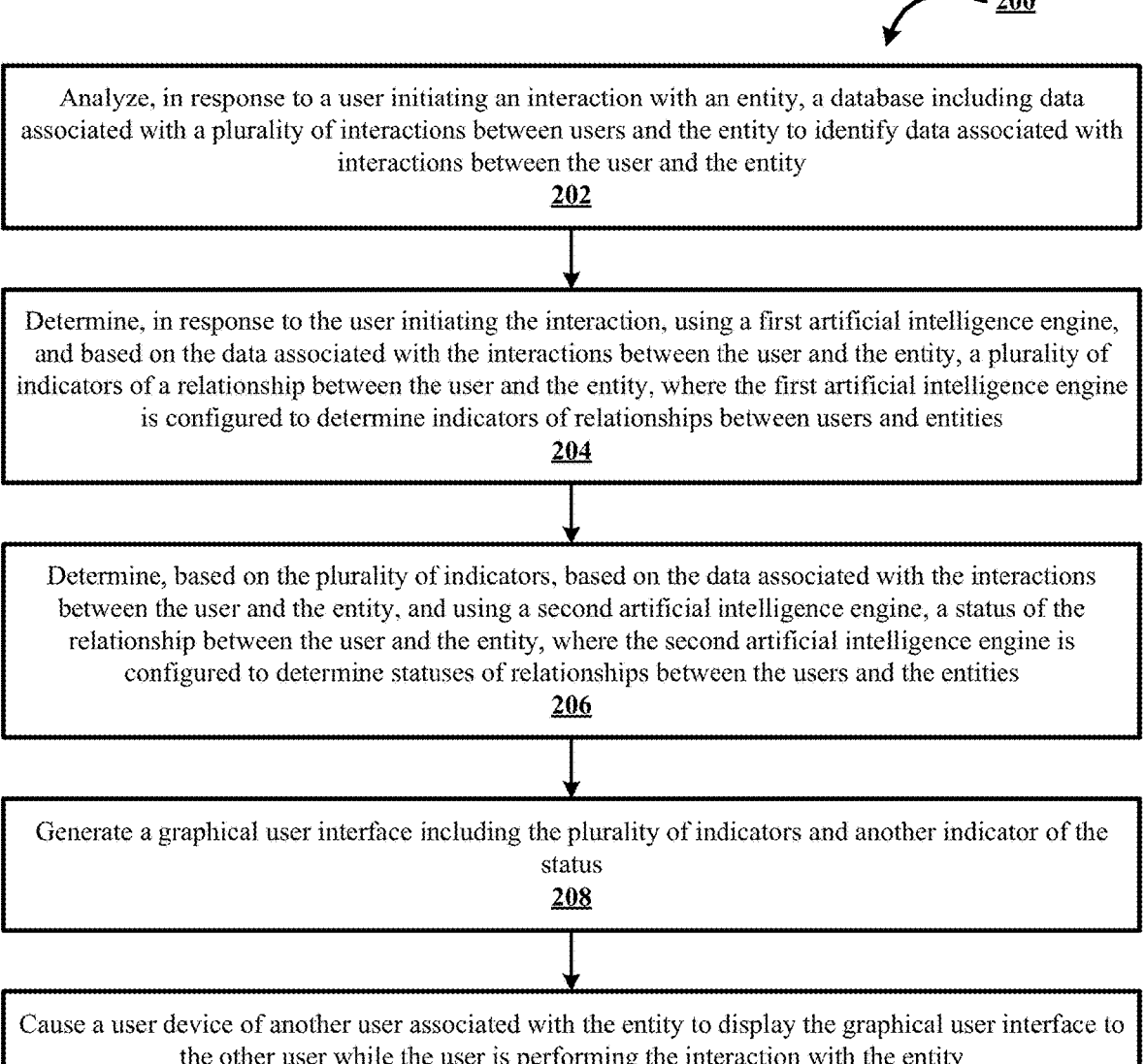

200

Analyze, in response to a user initiating an interaction with an entity, a database including data associated with a plurality of interactions between users and the entity to identify data associated with interactions between the user and the entity
202

Determine, in response to the user initiating the interaction, using a first artificial intelligence engine, and based on the data associated with the interactions between the user and the entity, a plurality of indicators of a relationship between the user and the entity, where the first artificial intelligence engine is configured to determine indicators of relationships between users and entities
204

Determine, based on the plurality of indicators, based on the data associated with the interactions between the user and the entity, and using a second artificial intelligence engine, a status of the relationship between the user and the entity, where the second artificial intelligence engine is configured to determine statuses of relationships between the users and the entities
206

Generate a graphical user interface including the plurality of indicators and another indicator of the status
208

Cause a user device of another user associated with the entity to display the graphical user interface to the other user while the user is performing the interaction with the entity
210

FIGURE 2

SYSTEMS AND METHODS FOR DETECTING ATTRITION IN A DISTRIBUTED NETWORK USING ARTIFICIAL INTELLIGENCE

TECHNOLOGICAL FIELD

Example embodiments of the present disclosure relate to systems and methods for detecting attrition in a distributed network using artificial intelligence.

BACKGROUND

In a distributed network, computer programming, software, and data are spread across multiple computers, referred to as nodes. The nodes can communicate complex messages through each other. Within a distributed network, the nodes may share resources to perform various functions.

BRIEF SUMMARY

Systems, methods, and computer program products are provided for detecting attrition in a distributed network using artificial intelligence.

In one aspect, the present invention is directed to a system for detecting attrition in a distributed network using artificial intelligence. The system may include a first artificial intelligence engine configured to determine indicators of relationships between users and entities and a second artificial intelligence engine configured to determine statuses of relationships between the users and the entities. The system may include a processing device and a non-transitory storage device including computer program code stored thereon. The computer program code may include computer instructions configured to cause the processing device to analyze, in response to a user initiating an interaction with an entity, a database including data associated with a plurality of interactions between users and the entity to identify data associated with interactions between the user and the entity. The computer program code may include computer instructions configured to cause the processing device to determine, in response to the user initiating the interaction, using the first artificial intelligence engine, and based on the data associated with the interactions between the user and the entity, a plurality of indicators of a relationship between the user and the entity. The computer program code may include computer instructions configured to cause the processing device to determine, based on the plurality of indicators, based on the data associated with the interactions between the user and the entity, and using the second artificial intelligence engine, a status of the relationship between the user and the entity. The computer program code may include computer instructions configured to cause the processing device to generate a graphical user interface comprising the plurality of indicators and another indicator of the status and cause a user device of another user associated with the entity to display the graphical user interface to the other user while the user is performing the interaction with the entity.

In some embodiments, the plurality of indicators may include a first indicator of a number of positive interactions between the user and the entity over a historical time period, a second indicator of a number of negative interactions between the user and the entity over the historical time period, a third indicator of a total number of interactions between the user and the entity over the historical time period, a fourth indicator of a frequency of interactions between the user and the entity over another historical time period, and a fifth indicator of a number of technologydifficulty-related interactions between the user and the entity over the historical time period.

In some embodiments, the computer program code may include computer instructions configured to cause the processing device to, when determining the status of the relationship between the user and the entity, determine, based on the data associated with the interactions between the user and the entity, using the second artificial intelligence engine, and for each interaction of the interactions between the user and the entity, a nature of the interaction. Additionally, or alternatively, the nature of the interaction may include positive, negative, neutral, technology-difficulty-related, assistance-related, and/or the like.

In some embodiments, the data associated with the plurality of interactions between the users and the entity may include, for each interaction, a time of the interaction, a date of the interaction, a type of interaction, an amount of resources involved in the interaction, an account involved in the interaction, a payment instrument involved in the interaction, and a user associated with the entity involved in the interaction. Additionally, or alternatively, the type of interaction may include in-person, phone-based, browser-based, application-based, automated-voice-interactive-based, chat-bot-based, transaction, inquiry, request, and/or the like.

In some embodiments, the computer program code may include computer instructions configured to cause the processing device to update, in real-time during the interaction between the user and the entity, using the first artificial intelligence engine, and based on new data generated in the database for the interaction, the plurality of indicators of the relationship between the user and the entity. The computer program code may include computer instructions configured to cause the processing device to update, in real-time during the interaction between the user and the entity, using the second artificial intelligence engine, and based on the new data generated in the database for the interaction, the status of the relationship between the user and the entity. The computer program code may include computer instructions configured to cause the processing device to update, in real-time during the interaction between the user and the entity, the graphical user interface to include the updated plurality of indicators and the updated status. The computer program code may include computer instructions configured to cause the processing device to cause, in real-time during the interaction between the user and the entity, the user device of the other user associated with the entity to display the graphical user interface to the other user while the user is performing the interaction with the entity.

In some embodiments, the system may include the user device, the user device may include the display, and the computer program code may include computer instructions configured to cause the processing device to, when causing the user device to display the graphical user interface, display the graphical user interface on the display.

In some embodiments, the computer program code may include computer instructions configured to cause the processing device to determine whether a first indicator of the plurality of indicators satisfies a threshold, generate, in response to the first indicator satisfying the threshold, a notification, and provide the notification to a plurality of user devices associated with the entity.

In some embodiments, the computer program code may include computer instructions configured to cause the processing device to determine whether the status of the relationship between the user and the entity satisfies a threshold, generate, in response to the status satisfying the threshold, a notification, and provide the notification to a plurality of user devices associated with the entity.

In another aspect, the present invention embraces a computer program product for detecting attrition in a distributed network using artificial intelligence. The computer program product may include a non-transitory computer-readable medium include code causing an apparatus to analyze, in response to a user initiating an interaction with an entity, a database including data associated with a plurality of interactions between users and the entity to identify data associated with interactions between the user and the entity. The computer program product may include a non-transitory computer-readable medium including code causing an apparatus to determine, in response to the user initiating the interaction, using a first artificial intelligence engine, and based on the data associated with the interactions between the user and the entity, a plurality of indicators of a relationship between the user and the entity, where the first artificial intelligence engine is configured to determine indicators of relationships between users and entities. The computer program product may include a non-transitory computer-readable medium including code causing an apparatus to determine, based on the plurality of indicators, based on the data associated with the interactions between the user and the entity, and using a second artificial intelligence engine, a status of the relationship between the user and the entity, where the second artificial intelligence engine is configured to determine statuses of relationships between the users and the entities. The computer program product may include a non-transitory computer-readable medium including code causing an apparatus to generate a graphical user interface including the plurality of indicators and another indicator of the status and cause a user device of another user associated with the entity to display the graphical user interface to the other user while the user is performing the interaction with the entity.

In some embodiments, the plurality of indicators may include a first indicator of a number of positive interactions between the user and the entity over a historical time period, a second indicator of a number of negative interactions between the user and the entity over the historical time period, a third indicator of a total number of interactions between the user and the entity over the historical time period, a fourth indicator of a frequency of interactions between the user and the entity over another historical time period, and a fifth indicator of a number of technology-difficulty-related interactions between the user and the entity over the historical time period.

In some embodiments, the non-transitory computer-readable medium may include code causing the apparatus to, when determining the status of the relationship between the user and the entity, determine, based on the data associated with the interactions between the user and the entity, using the second artificial intelligence engine, and for each interaction of the interactions between the user and the entity, a nature of the interaction. Additionally, or alternatively, the nature of the interaction may include positive, negative, neutral, technology-difficulty-related, assistance-related, and/or the like.

In some embodiments, the data associated with the plurality of interactions between the users and the entity may include, for each interaction, a time of the interaction, a date of the interaction, a type of interaction, an amount of resources involved in the interaction, an account involved in the interaction, a payment instrument involved in the interaction, and a user associated with the entity involved in the interaction. Additionally, or alternatively, the type of interaction may include in-person, phone-based, browser-based, application-based, automated-voice-interactive-based, chatbot-based, transaction, inquiry, request, and/or the like.

In some embodiments, the non-transitory computer-readable medium may include code causing the apparatus to update, in real-time during the interaction between the user and the entity, using the first artificial intelligence engine, and based on new data generated in the database for the interaction, the plurality of indicators of the relationship between the user and the entity. The non-transitory computer-readable medium may include code causing the apparatus to update, in real-time during the interaction between the user and the entity, using the second artificial intelligence engine, and based on the new data generated in the database for the interaction, the status of the relationship between the user and the entity. The non-transitory computer-readable medium may include code causing the apparatus to update, in real-time during the interaction between the user and the entity, the graphical user interface to include the updated plurality of indicators and the updated status. The non-transitory computer-readable medium may include code causing the apparatus to cause, in real-time during the interaction between the user and the entity, the user device of the other user associated with the entity to display the graphical user interface to the other user while the user is performing the interaction with the entity.

In some embodiments, the apparatus may include the user device, the user device may include a display, and the non-transitory computer-readable medium may include code causing the apparatus to, when causing the user device to display the graphical user interface, display the graphical user interface on the display.

In some embodiments, the non-transitory computer-readable medium may include code causing the apparatus to determine whether a first indicator of the plurality of indicators satisfies a threshold, generate, in response to the first indicator satisfying the threshold, a notification, and provide the notification to a plurality of user devices associated with the entity.

In another aspect, the present invention is directed to a method for detecting attrition in a distributed network using artificial intelligence. The method may include analyzing, in response to a user initiating an interaction with an entity, a database including data associated with a plurality of interactions between users and the entity to identify data associated with interactions between the user and the entity. The method may include determining, in response to the user initiating the interaction, using a first artificial intelligence engine, and based on the data associated with the interactions between the user and the entity, a plurality of indicators of a relationship between the user and the entity, where the first artificial intelligence engine is configured to determine indicators of relationships between users and entities. The method may include determining, based on the plurality of indicators, based on the data associated with the interactions between the user and the entity, and using a second artificial intelligence engine, a status of the relationship between the user and the entity, where the second artificial intelligence engine is configured to determine statuses of relationships between the users and the entities. The method may include generating a graphical user interface including the plurality of indicators and another indicator of the status and causing a user device of another user associated with the entity to display the graphical user interface to the other user while the user is performing the interaction with the entity.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components or blocks than those shown in the figures.

Figure 1A:
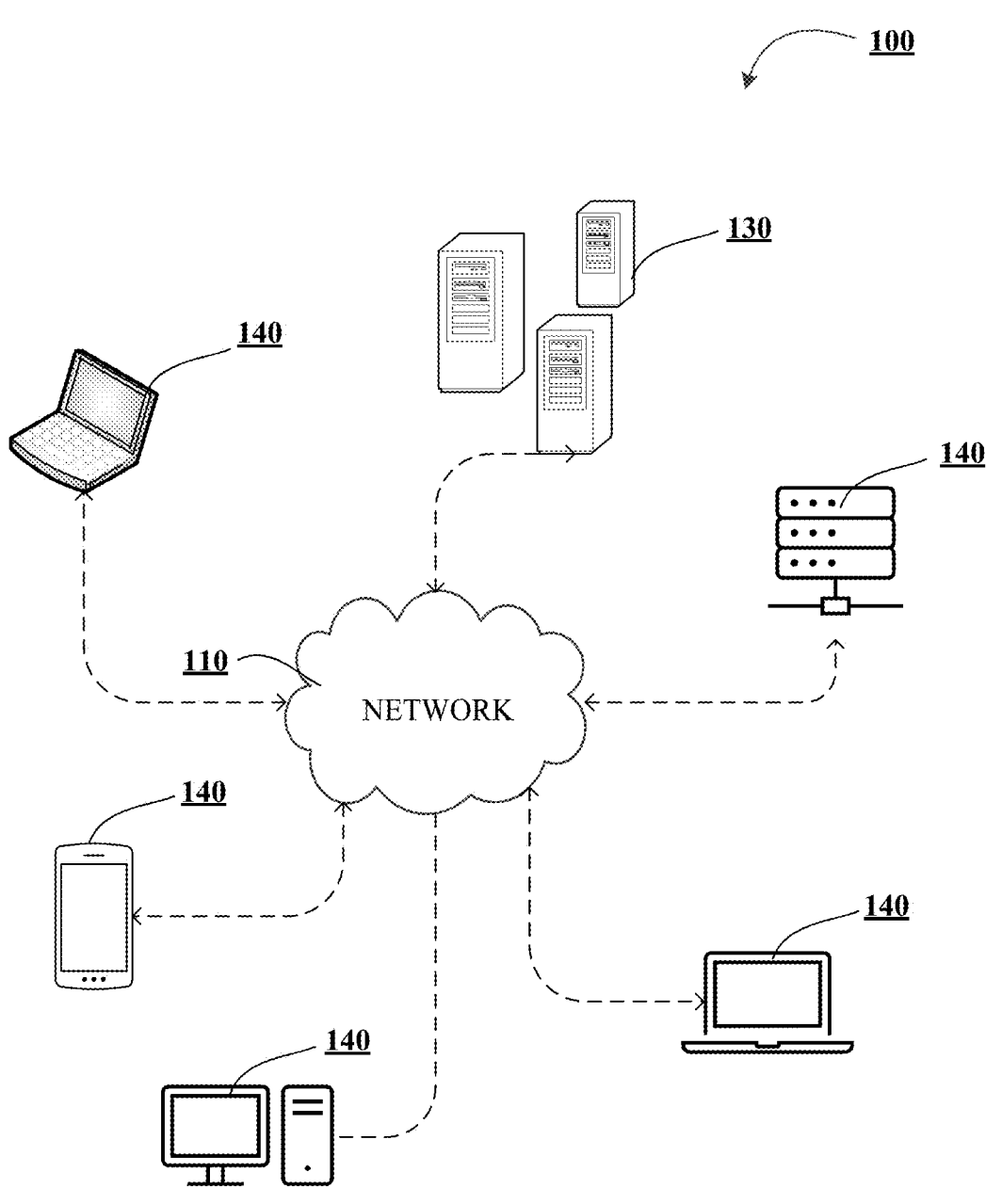
Figure 1B:
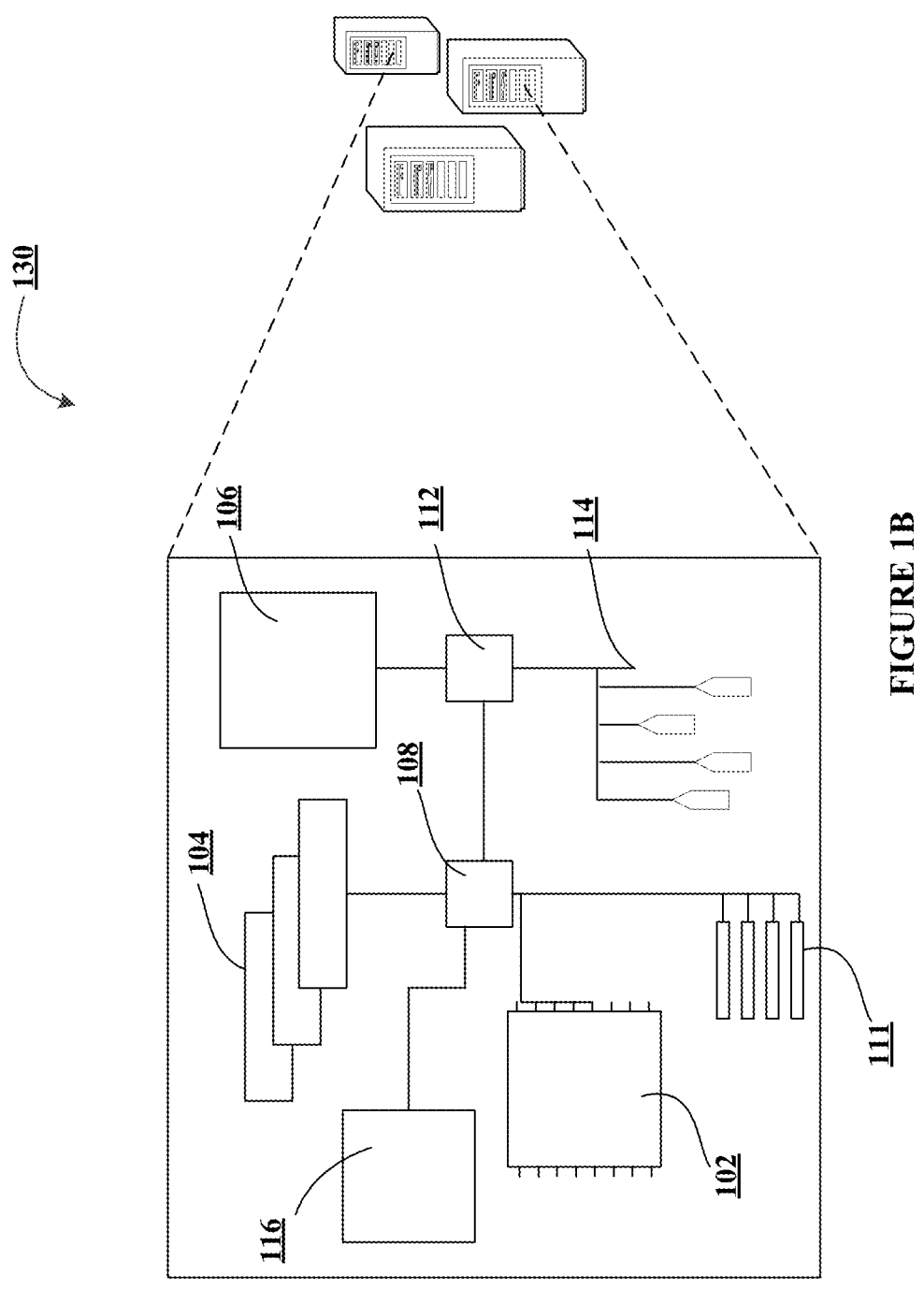
Figure 1C:
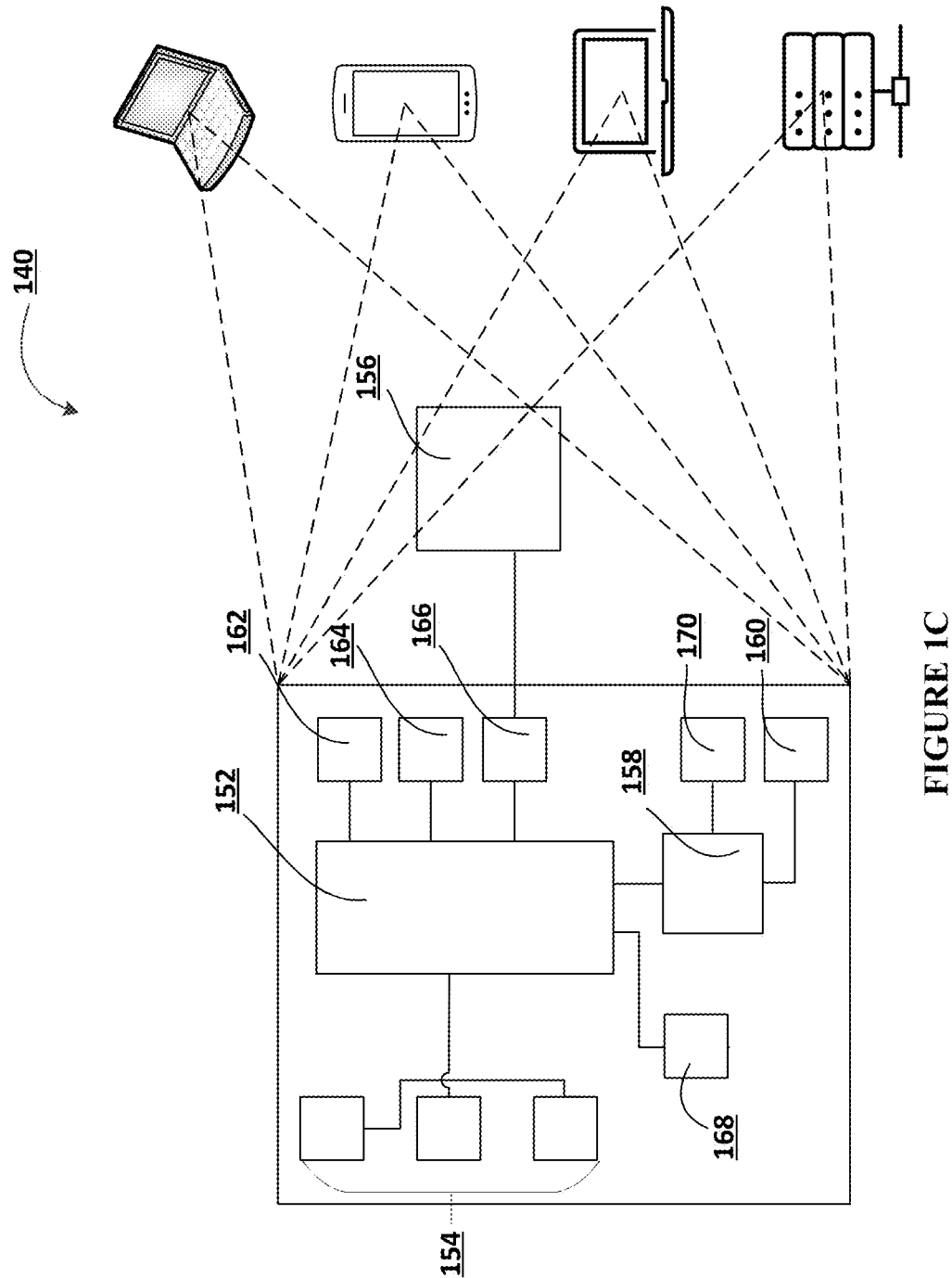

FIGS. 1A-1C illustrates technical components of an exemplary distributed computing environment for detecting attrition in a distributed network using artificial intelligence, in accordance with an embodiment of the disclosure;

FIG. 2 illustrates a process flow for detecting attrition in a distributed network using artificial intelligence, in accordance with an embodiment of the disclosure.

Figure 3:
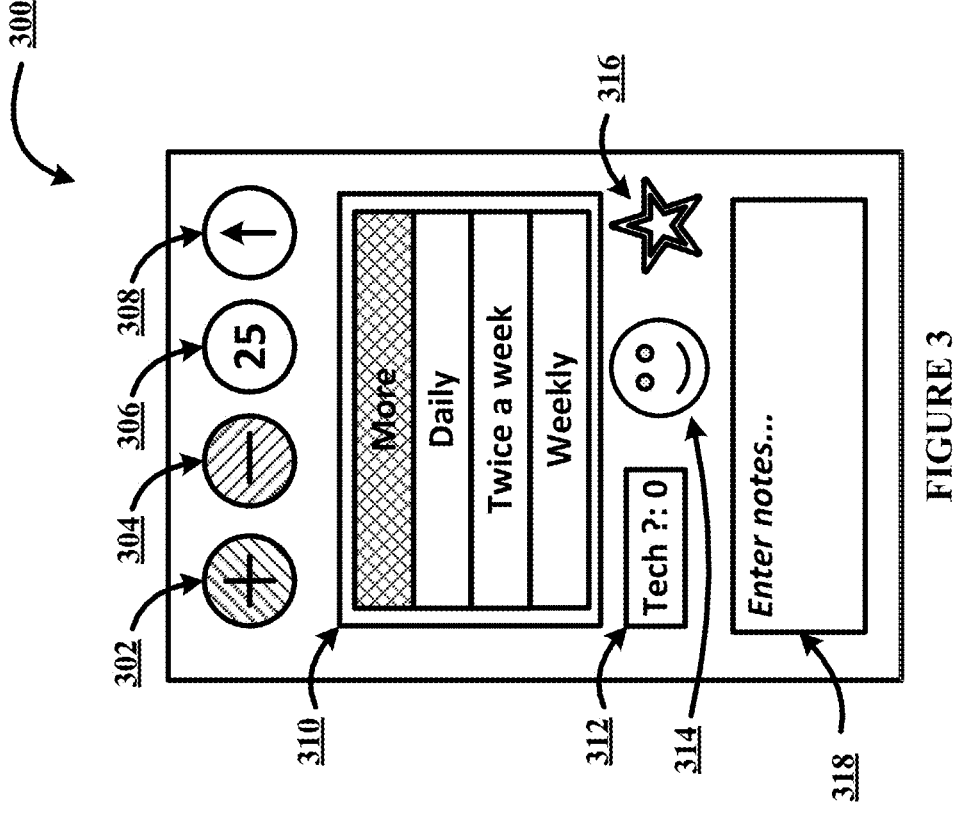

FIG. 3 illustrates a graphical user interface for detecting attrition in a distributed network using artificial intelligence, in accordance with an embodiment of the disclosure.

Figure 4:
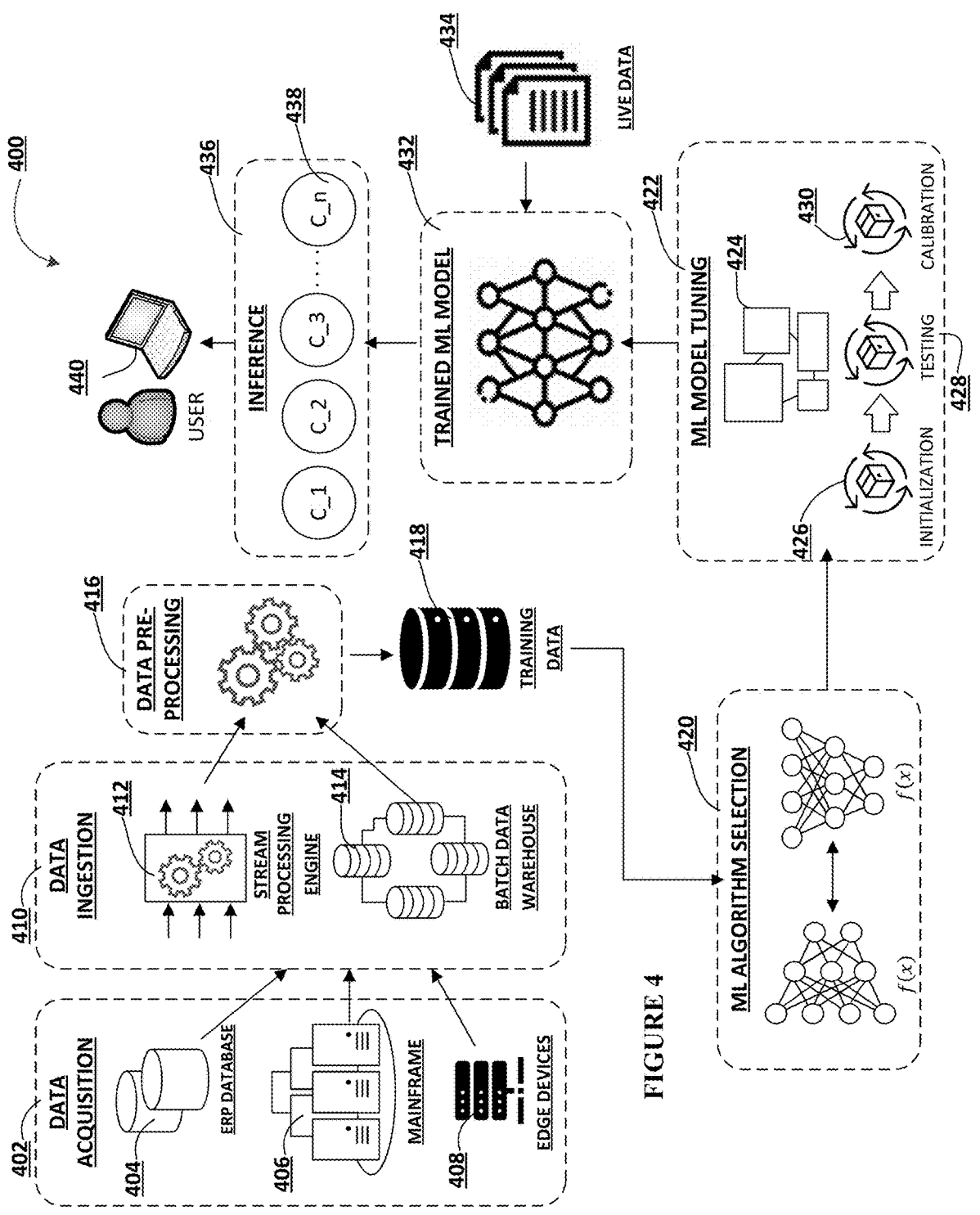

FIG. 4 illustrates an exemplary architecture of a machine learning (ML) subsystem, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers, or any other aspect of the operations of the organization. As such, the entity may be any institution, group, association, financial institution, establishment, company, union, authority, or the like, employing information technology resources for processing large amounts of data.

As described herein, a "user" may be an individual associated with an entity. As such, in some embodiments, the user may be an individual having past relationships, current relationships or potential future relationships with an entity.

In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like. In some embodiments, an interaction may refer to and/or include a resource transfer, a resource distribution, resource allocation, transaction, and/or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, property, and the like, and/or the ability and opportunity to access and use the same. Some example implementations herein contemplate resources held by a user, including resources that are stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository—a storage location where one or more resources are organized, stored, and retrieved electronically using a computing device.

As used herein, a "resource transfer," "resource distribution," or "resource allocation" may refer to any transaction, activities, or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer," a "transaction," a "transaction event," or a "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

FIGS. 1A-1C illustrate technical components of an exemplary distributed computing environment 100 for detecting attrition in a distributed network using artificial intelligence (e.g., a virtual world), in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and in some embodiments one or more of the systems, devices, and/or servers may be combined into a single system, device, and/or server, and/or be made up of multiple systems, devices, and/or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server (e.g., the system 130). In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file servers, and/or the like, various forms of digital computing devices, such as laptops, desktops, video recorders, audio/video players, radios, workstations, and/or the like, and/or any other auxiliary network devices, such as wearable devices, Internet-of-things devices, electronic kiosk devices, entertainment consoles, mainframes, and/or the like, and/or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, and/or the like. The network 110 may be secure and/or unsecure and may also include wireless and/or wired and/or optical interconnection technology.

The structure of the distributed computing environment and its components, connections and relationships, and their functions, are exemplary, and are not meant to limit implementations of the disclosures described and/or claimed herein. For example, the distributed computing environment 100 may include more, fewer, and/or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102 (e.g., a processing device), memory 104, a storage device 106, and an input/output (I/O) device 116. The system 130 may also include a high-speed interface 108 connecting to the memory 104, and a low-speed interface 112 connecting to low-speed bus 114 and storage device 106. Each of the components 102, 104, 106, 108, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. For example, the processor 102 may execute computer program code stored on a non-transitory storage device (e.g., the memory 104), which may cause the processor 102 to perform one or more of the process flows described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may include a computer-readable medium, such as a floppy disk device, a hard disk device, an optical disk device, a tape device, a flash memory, or other similar solid state memory device, and/or an array of devices, including devices in a storage area network or other configurations. A computer program product can be tangibly embodied in an information carrier. The computer program product may also contain instructions that, when executed, perform one or more methods, such as those described herein. The information carrier may be a computer-readable medium and/or a machine-readable medium, such as the memory 104, the storage device 106, and/or memory on processor 102.

The high-speed interface 108 manages bandwidth-intensive operations for the system 130, while the low-speed interface 112 (e.g., a low-speed controller) manages lower bandwidth-intensive operations. Such allocation of functions is exemplary. In some embodiments, the high-speed interface 108 is coupled to memory 104, the input/output (I/O) device 116 (e.g., through a graphics processor or accelerator), and high-speed expansion ports 111, which may accept various expansion cards. In some embodiments, the low-speed interface 112 may be coupled to the storage device 106 and the low-speed bus 114 (e.g., a low-speed expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device, such as a switch or router (e.g., through a network adapter).

The system 130 may be implemented in a number of different forms. For example, the system 130 may be implemented as a standard server, or multiple times in a group of such servers. In some embodiments, the system 130 may also be implemented as part of a rack server system or a personal computer such as a laptop computer. Additionally, or alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152 (e.g., a processing device), memory 154, an input/output device 156 (e.g., a display), a communication interface 158, and a transceiver 160, among other components. The end-point device(s) 140 may also be provided with a storage device, such as a microdrive or other device, to provide additional storage. Each of the components 152, 154, 156, 158, and 160, may be interconnected using various buses, cables, and/or the like and several of the components may be mounted on a common motherboard or in other manners as appropriate.

The processor 152 may be configured to execute instructions within the end-point device(s) 140, including instructions stored in the memory 154, which in one embodiment may include the instructions of an application that may perform the functions disclosed herein, including certain logic, data processing, and data storing functions. For example, the processor 152 may execute computer program code stored on a non-transitory storage device (e.g., the memory 154), which may cause the processor 152 to perform one or more of the process flows described herein. The processor 152 may be implemented as a chipset of chips that include separate and multiple analog and digital processors. The processor 152 may be configured to provide, for example, for coordination of the other components of the end-point device(s) 140, such as control of user interfaces, applications run by end-point device(s) 140, and/or wireless communication by end-point device(s) 140.

The processor 152 may be configured to communicate with the user through a control interface 164 and a display interface 166 coupled to the input/output device 156. The input/output device 156 may be, for example, a TFT LCD (Thin-Film-Transistor Liquid Crystal Display) or an OLED (Organic Light Emitting Diode) display, or other appropriate display technology. The display interface 166 may include appropriate circuitry and be configured for driving the input/output device 156 to present graphical and other information to a user. The control interface 164 may receive commands from a user and convert them for submission to the processor 152. In addition, an external interface 168 may be provided in communication with the processor 152, so as to enable near area communication of end-point device(s) 140 with other devices. External interface 168 may provide, for example, for wired communication and/or wireless communication, and the end-point device(s) 140 may include multiple external interfaces 168. In some embodiments, the control interface 164 and/or the display interface 166 may include a heads-up display worn on the user's head, one or more devices worn by the user (e.g., on the user's hands), one or more devices held by the user (e.g., a controller device), and/or the like for rendering visual content, receiving input from the user, providing haptic feedback to the user, and/or the like. For example, the end-point device(s) 140 may be and/or include a virtual reality headset, a virtual reality system (e.g., including a headset and one or more accessories), and/or the like.

The memory 154 stores information within the end-point device(s) 140. The memory 154 may be implemented as one or more of a computer-readable medium or media, a volatile memory unit or units, and/or a non-volatile memory unit or units. Expansion memory may also be provided and connected to end-point device(s) 140 through an expansion interface, which may include, for example, a SIMM (Single In Line Memory Module) card interface. Such expansion memory may provide extra storage space for end-point device(s) 140 and may also store applications and/or other information therein. In some embodiments, expansion memory may include instructions to carry out or supplement the processes described herein and may include secure information. For example, expansion memory may be provided as a security module for end-point device(s) 140 and may be programmed with instructions that permit secure use of end-point device(s) 140. Additionally, or alternatively, secure applications may be provided via SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product may include instructions that, when executed, perform one or more methods, such as those described herein. The information carrier may be a computer-readable medium and/or a machine-readable medium, such as the memory 154, expansion memory, memory on the processor 152, and/or a propagated signal that may be received, for example, over transceiver 160 and/or external interface 168.

In some embodiments, a user may use the end-point device(s) 140 to transmit and/or receive information and/or commands to and/or from the system 130 via the network 110. Communication between the system 130 and the end-point device(s) 140 may be subject to an authentication protocol allowing the system 130 to maintain security by permitting only authenticated users and/or processes to access protected resources of the system 130, which may include servers, databases, applications, and/or any of the components described herein. To this end, the system 130 may trigger an authentication subsystem that may require the user and/or the process to provide authentication credentials to determine whether the user and/or the process is eligible to access the protected resources. Once the authentication credentials are validated and the user and/or the process is authenticated, the authentication subsystem may provide the user and/or the process with permissioned access to the protected resources. Similarly, the end-point device(s) 140 may provide the system 130 and/or other client devices permissioned access to the protected resources of the end-point device(s) 140, which may include a GPS (Global Positioning System) device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes and/or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. The communication interface 158 may provide for communications under various telecommunications standards (e.g., 2G, 3G, 4G, 5G, and/or the like) using their respective layered protocol stacks. These communications may occur through a transceiver 160, such as a radio-frequency transceiver. Short-range communication may occur, such as using a Bluetooth, Wi-Fi, or other such transceiver. GPS receiver module 170 may provide additional navigation-related and/or location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker (e.g., in a handset) of end-point device(s) 140. Such sound may include sound from voice telephone calls, may include recorded sound (e.g., voice messages, music files, and/or the like), and/or may include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

As noted, in a distributed network, computer programming, software, and data are spread across multiple computers, referred to as nodes. The nodes can communicate complex messages through each other. Within a distributed network, the nodes may share resources to perform various functions. For example, an entity may operate a distributed network that includes thousands of nodes in various physical locations that provide users (e.g., customers of the entity, employees of entities that are customers of the entity, and/or the like) access to information stored on the distributed network and services provided by the distributed network and/or the entity. The distributed network may also provide other users (e.g., employees of the entity) access to the information stored on the distributed network, provide the services to the users, assist the users with accessing the information or requesting the services, and/or the like. However, when the distributed network does not function properly and/or users have problems accessing the information and/or services on the distributed network (e.g., due to technical problems, lack of understanding how to use the distributed network, and/or the like), and/or the like, user attrition may occur. Such user attrition may reduce the number of nodes on the distributed network potentially affecting performance of the distributed network, negatively impact the entity operating the distributed network, and consume significant computing resources (e.g., processing resources, memory resources, power resources, communication resources, and/or the like) and/or network resources. Furthermore, the entity may not be capable of detecting user attrition such that the improper functioning continues for a period of time and affects other users, thereby causing additional user attrition and further straining and negatively affecting performance of the distributed network.

Some embodiments of the present invention provide a solution to the aforementioned problems by using one or more artificial intelligence engines to detect user attrition with respect to an entity, generating a graphical user interface including indicators of potential user attrition, and causing a user device associated with a user associated with the entity (e.g., an employee of the entity) to display the graphical user interface. By detecting attrition, generating the graphical user interface including indicators of potential user attrition, and causing the user device to display the graphical user interface, systems and methods may prevent user attrition from impacting the distributed network, thereby conserving the computing resources (e.g., processing resources, memory resources, power resources, communication resources, and/or the like) and/or network resources that would otherwise be consumed by the user attrition.

Customer attrition is often the result of unresolved issues or unsatisfactory experiences, which can range from service-related issues to more complex matters like hardware problems or transactional difficulties. Identifying these issues early can be a challenging task due to the vast number of interactions and data points that need to be analyzed. Manual analysis of such large datasets is not only time-consuming but also prone to error, making it less effective in detecting potential problems in a timely manner.

Embodiments of the invention may be directed towards an Early Warning Attrition System (EWAS)—a predictive tool designed to identify clients who may have a high likelihood of leaving (e.g., attrition). The system may employ an associate dashboard, an intuitive interface (e.g., a graphical user interface) that aggregates and presents a variety of key indicators related to client engagement and satisfaction. For example, one significant indicator could be the number of calls into the organization. An increase in the frequency of such interactions might suggest that a client is experiencing issues that are causing them dissatisfaction, and if not properly addressed, could lead to attrition. Another example may be the volume of transactions. A decrease in transaction volume might indicate a dwindling engagement with the organization's services, suggesting that the client may be considering other options. Yet another example may be hardware issues and offline instances. If a client frequently experiences hardware problems or connectivity issues, it might cause frustration and impact their overall experience negatively. This could make them consider switching to a more dependable service. Similarly, the volume and nature of complaints are may also be important factors. High numbers of complaints or a trend in particular complaint types can signal dissatisfaction and potential for attrition.

The system may collect data on all these parameters and analyze them in real time. If the system identifies potential red flags, it triggers an alert, providing the organization with an opportunity to proactively engage with the client, resolve any issues, and ultimately prevent attrition. In this way, an EWS not only helps to retain valuable clients but also helps to optimize resources by identifying issues before they escalate to a point where resolution becomes significantly more resource intensive.

FIG. 2 illustrates a process flow 200 for detecting attrition in a distributed network using artificial intelligence (e.g., a virtual world), in accordance with an embodiment of the disclosure. In some embodiments, one or more systems for hosting a distributed network for providing entity services (e.g., similar to the system 130 described herein with respect to FIGS. 1A-1C, similar to the end-point device(s) 140 described herein with respect to FIGS. 1A-1C, and/or the like) and/or the like may perform the process flow 200.

FIG. 3 illustrates a graphical user interface 300 for detecting attrition in a distributed network using artificial intelligence, in accordance with an embodiment of the disclosure. As described herein with respect to FIG. 2, the process flow 200 may include generating a graphical user interface. In this regard, the graphical user interface generated during the process flow 200 may be similar to the graphical user interface 300 in some embodiments. Accordingly, aspects of the graphical user interface 300 of FIG. 3 are described herein in conjunction with the process flow 200 of FIG. 2.

As shown in block 202, the process flow 200 may include analyzing, in response to a user (e.g., a customer of an entity, an employee of another entity that is a customer of an entity, such as a merchant, a service provider, and/or the like) initiating an interaction with an entity, a database including data associated with a plurality of interactions between users and the entity to identify data associated with interactions between the user and the entity. For example, one or more systems for hosting a distributed network for providing entity services may analyze, in response to a user initiating an interaction with an entity, a database comprising data associated with a plurality of interactions between users and the entity to identify data associated with interactions between the user and the entity. Additionally, or alternatively, the process flow 200 may include analyze the database at regular predetermined intervals (e.g., hourly, twice daily, daily, every other day, weekly, bi-weekly, monthly, and/or the like). In some embodiments, the process flow 200 may include querying the database to obtain the data associated with interactions between the user and the entity.

Additionally, or alternatively, the process flow 200 may include detecting that the user has initiated an interaction with the entity. For example, the process flow 200 may include detecting that the user has opened an application on a user device association with the user, detecting that the user has logged into a website associated with the entity, detecting that the user has entered a building (e.g., a branch location of a financial institution) associated with the entity (e.g., using user-identification techniques, such as facial recognition, proximity detection, and/or the like), detecting that the user has placed a telephone call to the entity, detecting that the user has initiated a session with a chatbot associated with the entity, and/or the like.

In some embodiments, the data associated with the plurality of interactions between the users and the entity may include, for each interaction, a time of the interaction, a date of the interaction, a type of interaction, an amount of resources involved in the interaction, an account involved in the interaction, a payment instrument involved in the interaction, a user associated with the entity involved in the interaction (e.g., an employee of the entity involved in the interaction), and/or the like. For example, the type of interaction may include an in-person interaction, a phone-based interaction, a browser-based interaction (e.g., online via a website), an application-based interaction (e.g., via an application executing on a user device associated with the user), an automated-voice-interactive-based interaction (e.g., an interactive voice response interaction, a voice-based interaction with an automated system, and/or the like), a chatbot-based interaction (e.g., a text-based interaction with an automated system via a website, text message, SMS, and/or the like), a transaction, an inquiry, or a request.

In some embodiments, the data associated with the plurality of interactions between the users and the entity may include data collected via one or more surveys from the users. For example, the process flow 200 may include requesting that the user complete a survey after an interaction with the entity (e.g., via a telephone-based survey, via an email-based survey, and/or the like) and the data collected via the survey may be stored in the database.

Additionally, or alternatively, the data associated with the plurality of interactions between the users and the entity may include data collected from notes (e.g., written notes, typed notes, voice notes, and/or the like) compiled by users associated with the entity (e.g., employees of the entity) before, during, and/or after interactions with the users. In some embodiments, the data associated with the plurality of interactions between the users and the entity may include data collected from customer relationship management software (e.g., sales management software).

As shown in block 204, the process flow 200 may include determining, in response to the user initiating the interaction, using a first artificial intelligence engine, and based on the data associated with the interactions between the user and the entity, a plurality of indicators of a relationship between the user and the entity, where the first artificial intelligence engine is configured to determine indicators of relationships between users and entities. For example, one or more systems for hosting a distributed network for providing entity services (e.g., including the first artificial intelligence engine) may determine, in response to the user initiating the interaction, using the first artificial intelligence engine, and based on the data associated with the interactions between the user and the entity, a plurality of indicators of a relationship between the user and the entity.

In some embodiments, the database may include data associated with one or more telephone calls placed by a user with the entity. For example, the data may include recordings, transcripts, and/or the like of telephone calls placed by the user with the entity including conversations between the user (e.g., a merchant that is a customer of the entity) and another user associated with the entity (e.g., an employee of the entity). In such an example, the process flow 200 may include using natural language processing to parse the natural language recordings, transcripts, and/or the like of telephone calls to determine the plurality of indicators of the relationship between the user and the entity. Additionally, or alternatively, the process flow 200 may include using natural language processing to parse the content of conversations in real-time to determine the plurality of indicators of the relationship between the user and the entity.

In some embodiments, the plurality of indicators may include an indicator of a number of positive interactions between the user and the entity over a historical time period, an indicator of a number of negative interactions between the user and the entity over the historical time period, an indicator of a total number of interactions between the user and the entity over the historical time period, and/or the like. For example, a high number of positive interactions may indicate a low likelihood of user attrition for the user such that an employee of the entity may not need to provide additional assistance to the user. As another example, a low number of positive interactions may indicate a high likelihood of user attrition for the user such that an employee of the entity may need to provide additional assistance to the user to ensure a positive interaction. As another example, a low number of negative interactions may indicate a low likelihood of user attrition for the user such that an employee of the entity may not need to provide additional assistance to the user. As another example, a high number of negative interactions may indicate a high likelihood of user attrition for the user such that an employee of the entity may need to provide additional assistance to the user to ensure a positive interaction. As another example, a low total number of interactions may indicate a high likelihood of user attrition for the user such that an employee of the entity may need to provide additional assistance to the user to ensure a positive interaction and/or encourage additional interactions. As another example, a high total number of interactions may indicate a low likelihood of user attrition for the user such that an employee of the entity may not need to provide additional assistance to the user.

Additionally, or alternatively, the plurality of indicators may include an indicator of a frequency of interactions between the user and the entity over another historical time period, an indicator of a number of technology-difficulty-related interactions between the user and the entity over the historical time period, and/or the like. For example, a high frequency of interactions may indicate a low likelihood of user attrition for the user such that an employee of the entity may not need to provide additional assistance to the user. As another example, a low frequency of interactions may indicate a high likelihood of user attrition for the user such that an employee of the entity may need to provide additional assistance to the user to ensure a positive interaction. As another example, a high number of technology-difficulty-related interactions (e.g., the user requested assistance with technology operated and/or hosted by the entity, the distributed network is not functioning properly for the user, and/or the like) may indicate a high likelihood of user attrition for the user such that an employee of the entity may need to provide additional assistance to the user to ensure a positive interaction. As another example, a low number of technology-difficulty-related interactions may indicate a low likelihood of user attrition for the user such that an employee of the entity may not need to provide additional assistance to the user.

In some embodiments, the first artificial intelligence engine may include one or more machine learning models. For example, the first artificial intelligence engine may include a machine learning subsystem similar to the machine learning subsystem shown and described herein with respect to FIG. 4. The first artificial intelligence engine may be trained using historical data including historical data associated with interactions between users and entities and historical indicators of relationships between the users and the entities to determine indicators of relationships between users and entities.

As shown in block 206, the process flow 200 may include determining, based on the plurality of indicators, based on the data associated with the interactions between the user and the entity, and using a second artificial intelligence engine, a status of the relationship between the user and the entity, where the second artificial intelligence engine is configured to determine statuses of relationships between the users and the entities. For example, one or more systems for hosting a distributed network for providing entity services (e.g., including the second artificial intelligence engine) may determine, based on the plurality of indicators, based on the data associated with the interactions between the user and the entity, and using the second artificial intelligence engine, a status of the relationship between the user and the entity.

In some embodiments, the process flow 200 may include determining, based on the data associated with the interactions between the user and the entity, using the second artificial intelligence engine, and for each interaction of the interactions between the user and the entity, a nature of the interaction. For example, the nature of the interaction may include a positive interaction, a negative interaction, a neutral interaction (e.g., neither positive nor negative), a technology-difficulty-related interaction (e.g., the user requested assistance with technology operated or hosted by the entity, the distributed network is not functioning properly for the user, and/or the like), an assistance-related interaction (e.g., the user requested assistance and/or the like), and/or the like.

In some embodiments, the second artificial intelligence engine may include one or more machine learning models. For example, the second artificial intelligence engine may include a machine learning subsystem similar to the machine learning subsystem shown and described herein with respect to FIG. 4. The second artificial intelligence engine may be trained using historical data including historical indicators of relationships between users and entities, historical data associated with interactions between users and entities, and historical statuses of the relationships between users and entities to determine statuses of the relationships between users and entities.

As shown in block 208, the process flow 200 may include generating a graphical user interface including the plurality of indicators and another indicator of the status. For example, one or more systems for hosting a distributed network for providing entity services may generate a graphical user interface including the plurality of indicators and another indicator of the status. In some embodiments, the graphical user interface may be similar to the graphical user interface 300 shown and described herein with respect to FIG. 3.

In some embodiments, the plurality of indicators may include an indicator of a number of positive interactions between the user and the entity over a historical time period. For example, the indicator may be similar to the indicator 302 shown in FIG. 3 in which a plus symbol is positioned within a colored shape (e.g., a circle as shown in FIG. 3, a square, a rectangle, a triangle, and/or the like), where the color of the shape indicates the number of positive interactions between the user and the entity over the historical time period. For example, if the user has had a large number, a moderate number, or a small number of positive interactions over the historical time period, the shape may be colored green, yellow, or red, respectively. As another example, the shape of the indicator may be filled from bottom-to-top based on the number of positive interactions between the user and the entity over the historical time period, such that only a bottom portion of the shape is filled with color if the number of positive interactions between the user and the entity over the historical time period is small and correspondingly larger portions of the shape are filled with increasing numbers of positive interactions between the user and the entity over the historical time period.

In some embodiments, the plurality of indicators may include an indicator of a number of negative interactions between the user and the entity over the historical time period. For example, the indicator may be similar to the indicator 304 shown in FIG. 3 in which a minus symbol is positioned within a colored shape (e.g., a circle as shown in FIG. 3, a square, a rectangle, a triangle, and/or the like), where the color of the shape indicates the number of negative interactions between the user and the entity over the historical time period. For example, if the user has had a large number, a moderate number, or a small number of negative interactions over the historical time period, the shape may be colored red, yellow, or green, respectively. As another example, the shape of the indicator may be filled from bottom-to-top based on the number of negative interactions between the user and the entity over the historical time period, such that only a bottom portion of the shape is filled with color if the number of negative interactions between the user and the entity over the historical time period is small and correspondingly larger portions of the shape are filled with increasing numbers of negative interactions between the user and the entity over the historical time period.

In some embodiments, the plurality of indicators may include an indicator of a total number of interactions between the user and the entity over the historical time period. For example, the indicator may be similar to the indicator 306 shown in FIG. 3 in which the total number of interactions between the user and the entity over the historical time period is positioned within a shape (e.g., a circle as shown in FIG. 3, a square, a rectangle, a triangle, and/or the like). In some embodiments, the color of the shape may indicate the total number of interactions between the user and the entity over the historical time period. For example, if the user has had a large number, a moderate number, or a small number of interactions over the historical time period, the shape may be colored green, yellow, or red, respectively. As another example, the shape of the indicator may be filled from bottom-to-top based on the total number of interactions between the user and the entity over the historical time period, such that only a bottom portion of the shape is filled with color if the total number of interactions between the user and the entity over the historical time period is small and correspondingly larger portions of the shape are filled with increasing numbers of interactions between the user and the entity over the historical time period.

In some embodiments, the plurality of indicators may include an indicator of whether the total number of interactions between the user and the entity over a historical time period is increasing, steady, or decreasing. For example, the indicator may be similar to the indicator 308 shown in FIG. 3 in which an arrow is positioned within a shape (e.g., a circle as shown in FIG. 3, a square, a rectangle, a triangle, and/or the like) to show whether the total number of interactions between the user and the entity over the historical time period is increasing (e.g., with an upward arrow as shown in FIG. 3), steady (e.g., with a horizontal arrow), or decreasing (e.g., with a downward arrow).

In some embodiments, the plurality of indicators may include an indicator of a frequency of interactions between the user and the entity over a historical time period. For example, the indicator may be similar to the indicator 310 shown in FIG. 3 in which multiple different frequencies of interaction (e.g., weekly, twice a week, daily, more, and/or the like) are displayed and the current frequency is indicated by changing its color. In FIG. 3, the indicator 310 includes the "more" frequency shown in a different color than the other frequencies to indicate that the user has interacted with the entity more frequently than once a day over the historical time period.

In some embodiments, the plurality of indicators may include an indicator of a number of technology-difficulty-related interactions between the user and the entity over a historical time period. For example, the indicator may be similar to the indicator 312 shown in FIG. 3 in which the indicator includes an identifier of the indicator (e.g., the text "Tech?:" as shown in FIG. 3, a symbol, an image, an icon, and/or the like) and the number of technology-difficulty-related interactions.

In some embodiments, the plurality of indicators may include an indicator of the status of the relationship between the user and the entity. For example, the indicator may be similar to the indicator 314 shown in FIG. 3 in which the status of the relationship between the user and the entity is indicated by a smiley face, a neutral face, or a sad face. In such an example, the smiley face, the neutral face, and the sad face may respectively correspond to a positive, neutral, and negative status of the relationship between the user and the entity. Additionally, or alternatively, the indicator of the status of the relationship may indicate the status using text, a rating scale (e.g., from 1 to 10), color, arrows, symbols, images, icons, and/or the like.

In some embodiments, the plurality of indicators may include an indicator of whether the user has a status, a privilege, a level, and/or the like with the entity. For example, the indicator may be similar to the indicator 316 shown in FIG. 3 in which a symbol, such as a star, indicates that the user has a particular status with the entity (e.g., the entity is a private client and/or the like). Additionally, or alternatively, different symbols may indicate different statuses, privileges, levels, and/or the like with the entity.

In some embodiments, the graphical user interface 300 may include a text field 318 in which the other user associated with the entity (e.g., an employee of the entity, an associate, and/or the like) may enter additional information, notes, and/or the like regarding the user and/or the interaction (e.g., before, during, and/or after an interaction with the user). For example, the other user associated with the entity may enter steps taken (e.g., an intervention) performed by the other user in an effort to address one or more of the indicators and/or the status of the relationship. In some embodiments, the process flow 200 may include storing the information, notes, and/or the like entered by the other user in the text field 318 in the database including data associated with the plurality of interactions between users and the entity. Additionally, or alternatively, the process flow 200 may include, when generating the graphical user interface 300, including the information, notes, and/or the like entered by the other user in the text field 318 in the graphical user interface 300 to notify another user associated with the entity of steps previously taken to address one or more of the indicators and/or the status of the relationship.

As will be appreciated by one of ordinary skill in the art in view of the present disclosure, the graphical user interface 300 and its indicators shown and described herein with respect to FIG. 3 are exemplary. For example, the graphical user interface 300 may have a different shape and/or configuration of the indicators as compared to that shown in FIG. 3. As another example, the manner in which a given indicator indicates its respective information may be different than the manner described herein, similar to the manner in which another indicator indicates its respective information, and/or the like. As an example, the indicator 308 for whether the total number of interactions is increasing, steady, or decreasing may indicate whether the total number of interactions is increasing, steady, or decreasing using different colors in a manner similar to that described herein with respect to indicator 306 where increasing, steady, or decreasing may be respectively indicated using green, yellow, and red. Furthermore, the form of a given indicator may be different than the form described herein, similar to another form of indicator described herein, and/or the like. For example, the indicator 310 may indicate frequency of interactions using different colored shapes in a manner similar to that described herein with respect to indicator 306 where different colors indicate different frequencies.

As shown in block 210, the process flow 200 may include causing a user device of another user associated with the entity to display the graphical user interface to the other user while the user is performing the interaction with the entity. For example, one or more systems for hosting a distributed network for providing entity services may cause a user device of another user associated with the entity to display the graphical user interface to the other user while the user is performing the interaction with the entity.

In some embodiments, the process flow 200 may include predicting that the other user is going to initiate an interaction with the user (e.g., an employee of the entity is going to contact a customer, such as by telephone, email, and/or the like), generating, in response to predicting that the other user is going to initiate the interaction, the graphical user interface including the plurality of indicators and the other indicator of the status, and causing the user device associated with the other user to display the graphical user interface to the other user before the user performs the interaction with the entity. In such embodiments, the graphical user interface may provide the other user with indicators that need to be addressed, improved, resolved, and/or the like with the user during the interaction.

In some embodiments, the process flow 200 may include continuously updating the plurality of indicators, the status of the relationship, and the graphical user interface in real-time during the interaction with the entity (e.g., to alert an employee of the entity that the user is having a negative interaction, needs assistance, and/or the like). In this regard, the process flow 200 may include updating, in real-time during the interaction between the user and the entity, using the first artificial intelligence engine, and based on new data generated in the database for the interaction, the plurality of indicators of the relationship between the user and the entity. Additionally, or alternatively, the process flow 200 may include updating, in real-time during the interaction between the user and the entity, using the second artificial intelligence engine, and based on the new data generated in the database for the interaction, the status of the relationship between the user and the entity.

In some embodiments, the process flow 200 may include updating, in real-time during the interaction between the user and the entity, the graphical user interface to include the updated plurality of indicators and the updated status. Additionally, or alternatively, the process flow 200 may include causing, in real-time during the interaction between the user and the entity, the user device of the other user associated with the entity to display the updated graphical user interface to the other user while the user is performing the interaction with the entity.

In some embodiments, a user device including a display may perform the process flow 200. For example, the user device of the user associated with the entity may perform the process flow 200. In such embodiments, the process flow 200 may include displaying the graphical user interface on the display. In such embodiments, the user device may include the first and second artificial intelligence engines, may be communicatively connected to the first and second artificial intelligence engines, and/or the like.

In some embodiments, the process flow 200 may include determining whether an indicator of the plurality of indicators satisfies a threshold, generating, in response to the first indicator satisfying the threshold, a notification, and providing the notification to a plurality of user devices associated with the entity. For example, the process flow 200 may include determining if the number of negative interactions over a period of time has exceeded a threshold, and if it has, generating a notification about the number of negative interactions exceeding the threshold, and providing the notification to multiple devices and/or systems monitored by employees of the entity so that the employees can take action to prevent user attrition. As another example, the process flow 200 may include determining if the total number of interactions over a period of time has dropped below a threshold, and if it has, generating a notification about the total number of interactions dropping below the threshold, and providing the notification to multiple devices and/or systems monitored by employees of the entity so that the employees can take action to prevent user attrition.

In some embodiments, the process flow 200 may include determining whether the status of the relationship between the user and the entity satisfies a threshold, generating, in response to the status satisfying the threshold, a notification, and providing the notification to a plurality of user devices associated with the entity. For example, the process flow 200 may include determining if the status of the relationship has exceeded a threshold, and if it has, generating a notification about the status of the relationship exceeding the threshold, and providing the notification to multiple devices and/or systems monitored by employees of the entity so that the employees can take action to reward the user, reinforce the relationship with the user, and/or the like to further prevent user attrition. As another example, the process flow 200 may include determining if the status of the relationship has dropped below a threshold, and if it has, generating a notification about the status of the relationship dropping below the threshold, and providing the notification to multiple devices and/or systems monitored by employees of the entity so that the employees can take action to improve the relationship with the user, reinforce the relationship with the user, prevent user attrition, and/or the like.

In some embodiments, the process flow 200 may include receiving, via the graphical user interface, input from the user selecting one of the indicators and changing, in response to the user selecting the indicator, the graphical user interface to include information associated with the indictor. For example, the process flow 200 may include receiving, via the graphical user interface, input from the user selecting indicator 312 for the number of technology-difficulty-related interactions and changing, in response to the user selecting indicator 312, the graphical user interface to include information regarding the technology-difficulty-related interactions (e.g., when the interactions occurred, one or more systems associated with the interactions, a service being requested during the interactions, one or more employees of the entity that helped resolve the interactions, a resolution to each of the interactions, and/or the like). As another example, the process flow 200 may include receiving, via the graphical user interface, input from the user selecting indicator 308 showing whether the total number of interactions is increasing, steady, or decreasing and changing, in response to the user selecting indicator 308, the graphical user interface to include a graph showing the interactions between the user and the entity over the historical period of time.

As will be appreciated by one of ordinary skill in the art in view of the present disclosure, the process flow 200 may include additional steps, alternative steps, and/or the like. The process flow 200 may include additional embodiments, such as any single embodiment or any combination of embodiments described herein. Although FIG. 2 shows example blocks of the process flow 200, in some embodiments, the process flow 200 may include additional blocks, fewer blocks, different blocks, or differently arranged blocks than those depicted in FIG. 2. Additionally, or alternatively, two or more of the blocks of the process flow 200 may be performed in parallel.

FIG. 4 illustrates an exemplary architecture of a machine learning (ML) subsystem 400, in accordance with an embodiment of the invention. The machine learning subsystem 400 may include a data acquisition engine 402, a data ingestion engine 410, a data pre-processing engine 416, a ML model tuning engine 422, and an inference engine 436. In some embodiments, one or more systems for hosting a distributed network for providing entity services may include and/or use the machine learning subsystem 400 to perform one or more of the steps of one or more of the process flows described herein. For example, the first artificial intelligence engine and/or the second artificial intelligence engine described herein with respect to FIG. 2 may include and/or use the machine learning subsystem 400 to perform one or more of the steps of process flow 200.

The data acquisition engine 402 may identify various internal and/or external data sources to generate, test, and/or integrate new features for training a machine learning model 424. These internal and/or external data sources 404, 406, and 408 may be initial locations where the data originates or where physical information is first digitized. The data acquisition engine 402 may identify the location of the data and describe connection characteristics for access and retrieval of data. In some embodiments, data is transported from each data source 404, 406, or 408 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the data sources 404, 406, and 408 may include data regarding one or more virtual worlds, data regarding one or more avatars, data regarding one or more objects, and/or Enterprise Resource Planning (ERP) databases that host data related to day-to-day business activities such as accounting, procurement, project management, exposure management, supply chain operations, and/or the like, a mainframe that is often an entity's central data processing center, edge devices that may be any piece of hardware, such as sensors, actuators, gadgets, appliances, and/or machines, that are programmed for certain applications and can transmit data over the internet or other networks, and/or the like. The data acquired by the data acquisition engine 402 from these data sources 404, 406, and 408 may then be transported to the data ingestion engine 410 for further processing. In some embodiments, the data sources 404, 406, and 408 may include historical data associated with virtual worlds, avatars, objects, and/or the like, historical data associated with actions taken by avatars, objects, and/or the like within virtual worlds, historical data associated with attributes, privileges, entitlements, and/or the like of avatars and/or objects, historical data associated with motives of users associated with avatars, historical data associated with access paths of avatars, historical data associated with viewing angles of avatars moving along access paths, historical data associated with visual content in virtual worlds, and/or the like.

Depending on the nature of the data imported from the data acquisition engine 402, the data ingestion engine 410 may move the data to a destination for storage or further analysis. Typically, the data imported from the data acquisition engine 402 may be in varying formats as they come from different sources, including RDBMS, other types of databases, S3 buckets, CSVs, or from streams. Since the data comes from different places, it needs to be cleansed and transformed so that it can be analyzed together with data from other sources. At the data acquisition engine 402, the data may be ingested in real-time, using a stream processing engine 412, in batches using the batch data warehouse 414, or a combination of both. The stream processing engine 412 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 414 collects and transfers data in batches according to scheduled intervals, trigger events, or any other logical ordering.

In machine learning, the quality of data and the useful information that can be derived therefrom directly affects the ability of the machine learning model 424 to learn. The data pre-processing engine 416 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 416 may implement feature extraction and/or selection techniques to generate training data 418. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 418 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 422 may be used to train a machine learning model 424 using the training data 418 to make predictions or decisions without explicitly being programmed to do so. The machine learning model 424 represents what was learned by the selected machine learning algorithm 420 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 422 may repeatedly execute cycles of initialization 426, testing 428, and calibration 430 to optimize the performance of the machine learning algorithm 420 and refine the results in preparation for deployment of those results for consumption or decision making. To this end, the ML model tuning engine 422 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 418. A fully trained machine learning model 432 is one whose hyperparameters are tuned and model accuracy maximized.

The trained machine learning model 432, similar to any other software application output, can be persisted to storage, file, memory, or application, or looped back into the processing component to be reprocessed. More often, the trained machine learning model 432 is deployed into an existing production environment to make practical business decisions based on live data 434. To this end, the machine learning subsystem 400 uses the inference engine 436 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 438) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 438) live data 434 based on how similar they are to one another to solve exploratory challenges where little is known about the data, provide a description or label (e.g., C_1, C_2 . . . C_n 438) to live data 434, such as in classification, and/or the like. These categorized outputs, groups (clusters), or labels are then presented to a user input system 440, which may be similar to the end-point device(s) 140 shown and described herein with respect to FIGS. 1A-1C. In still other cases, machine learning models that perform regression techniques may use live data 434 to predict or forecast continuous outcomes.

As noted, in some embodiments, one or more systems for hosting a distributed network for providing entity services described herein with respect to FIGS. 1A-1C and 2 may include and/or use the machine learning subsystem 400 to perform one or more of the steps of the process flows described herein. For example, the first artificial intelligence engine and/or the second artificial intelligence engine described herein with respect to FIG. 2 may include and/or use one or more machine learning models similar to trained machine learning model 432 and/or one or more inference engines similar to the inference engine 436. In some embodiments, the first artificial intelligence engine may use the one or more machine learning models to determine indicators of relationships between users and entities. Additionally, or alternatively, the second artificial intelligence engine may use the one or more machine learning models to determine statuses of relationships between the users and the entities.

It will be understood that the embodiment of the machine learning subsystem 400 illustrated in FIG. 4 is exemplary and that other embodiments may vary. As another example, in some embodiments, the machine learning subsystem 400 may include more, fewer, or different components.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (e.g., a non-transitory computer readable medium including firmware, resident software, micro-code, computer program code, and/or the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for detecting attrition in a distributed network using artificial intelligence, the system comprising:
 a first artificial intelligence engine configured to determine indicators of relationships between users and entities;
 a second artificial intelligence engine configured to determine statuses of relationships between the users and the entities;
 a processing device; and
 a non-transitory storage device comprising computer program code stored thereon, wherein the computer program code comprises computer instructions configured to cause the processing device to:

analyze, in response to a user initiating an interaction with an entity, a database comprising data associated with a plurality of interactions between users and the entity to identify data associated with interactions between the user and the entity;

determine, in response to the user initiating the interaction, using the first artificial intelligence engine, and based on the data associated with the interactions between the user and the entity, a plurality of indicators of a relationship between the user and the entity;

determine, based on the plurality of indicators, based on the data associated with the interactions between the user and the entity, and using the second artificial intelligence engine, a status of the relationship between the user and the entity;

generate a graphical user interface comprising the plurality of indicators and another indicator of the status;

cause a user device of another user associated with the entity to display the graphical user interface to the other user while the user is performing the interaction with the entity;

update, in real-time during the interaction between the user and the entity, using the first artificial intelligence engine, and based on new data generated in the database for the interaction, the plurality of indicators of the relationship between the user and the entity, wherein the new data comprises natural language data, and wherein the first artificial intelligence engine is configured to use natural language processing to parse the natural language data to update the plurality of indicators;

update, in real-time during the interaction between the user and the entity, using the second artificial intelligence engine, and based on the new data generated in the database for the interaction, the status of the relationship between the user and the entity;

update, in real-time during the interaction between the user and the entity, the graphical user interface to comprise the updated plurality of indicators and the updated status; and cause, in real-time during the interaction between the user and the entity, the user device of the other user associated with the entity to display the graphical user interface to the other user while the user is performing the interaction with the entity.

2. The system of claim 1, wherein the plurality of indicators comprises:

a first indicator of a number of positive interactions between the user and the entity over a historical time period;

a second indicator of a number of negative interactions between the user and the entity over the historical time period;

a third indicator of a total number of interactions between the user and the entity over the historical time period;

a fourth indicator of a frequency of interactions between the user and the entity over another historical time period; and a fifth indicator of a number of technology-difficulty-related interactions between the user and the entity over the historical time period.

3. The system of claim 1, wherein the computer program code comprises computer instructions configured to cause the processing device to, when determining the status of the relationship between the user and the entity, determine, based on the data associated with the interactions between the user and the entity, using the second artificial intelligence engine, and for each interaction of the interactions between the user and the entity, a nature of the interaction.

4. The system of claim 3, wherein the nature of the interaction comprises at least one of positive, negative, neutral, technology-difficulty-related, or assistance-related.

5. The system of claim 1, wherein the data associated with the plurality of interactions between the users and the entity comprises, for each interaction, a time of the interaction, a date of the interaction, a type of interaction, an amount of resources involved in the interaction, an account involved in the interaction, a payment instrument involved in the interaction, and a user associated with the entity involved in the interaction.

6. The system of claim 5, wherein the type of interaction comprises at least one of in-person, phone-based, browser-based, application-based, automated-voice-interactive-based, chat-bot-based, transaction, inquiry, or request.

7. The system of claim 1, wherein the system comprises the user device, wherein the user device comprises a display, and wherein the computer program code comprises computer instructions configured to cause the processing device to, when causing the user device to display the graphical user interface, display the graphical user interface on the display.

8. The system of claim 1, wherein the computer program code comprises computer instructions configured to cause the processing device to:

determine whether a first indicator of the plurality of indicators satisfies a threshold;

generate, in response to the first indicator satisfying the threshold, a notification; and provide the notification to a plurality of user devices associated with the entity.

9. The system of claim 1, wherein the computer program code comprises computer instructions configured to cause the processing device to:

determine whether the status of the relationship between the user and the entity satisfies a threshold;

generate, in response to the status satisfying the threshold, a notification; and provide the notification to a plurality of user devices associated with the entity.

10. A computer program product for detecting attrition in a distributed network using artificial intelligence, the computer program product comprising a non-transitory computer-readable medium comprising code causing an apparatus to:

analyze, in response to a user initiating an interaction with an entity, a database comprising data associated with a plurality of interactions between users and the entity to identify data associated with interactions between the user and the entity;

determine, in response to the user initiating the interaction, using a first artificial intelligence engine, and based on the data associated with the interactions between the user and the entity, a plurality of indicators of a relationship between the user and the entity, wherein the first artificial intelligence engine is configured to determine indicators of relationships between users and entities;

determine, based on the plurality of indicators, based on the data associated with the interactions between the user and the entity, and using a second artificial intelligence engine, a status of the relationship between the user and the entity, wherein the second artificial intelligence engine is configured to determine statuses of relationships between the users and the entities;

generate a graphical user interface comprising the plurality of indicators and another indicator of the status;

cause a user device of another user associated with the entity to display the graphical user interface to the other user while the user is performing the interaction with the entity;

update, in real-time during the interaction between the user and the entity, using the first artificial intelligence engine, and based on new data generated in the database for the interaction, the plurality of indicators of the relationship between the user and the entity, wherein the new data comprises natural language data, and wherein the first artificial intelligence engine is configured to use natural language processing to parse the natural language data to update the plurality of indicators;

update, in real-time during the interaction between the user and the entity, using the second artificial intelligence engine, and based on the new data generated in the database for the interaction, the status of the relationship between the user and the entity;

update, in real-time during the interaction between the user and the entity, the graphical user interface to comprise the updated plurality of indicators and the updated status; and cause, in real-time during the interaction between the user and the entity, the user device of the other user associated with the entity to display the graphical user interface to the other user while the user is performing the interaction with the entity.

11. The computer program product of claim 10, wherein the plurality of indicators comprises:

a first indicator of a number of positive interactions between the user and the entity over a historical time period;

a second indicator of a number of negative interactions between the user and the entity over the historical time period;

a third indicator of a total number of interactions between the user and the entity over the historical time period;

a fourth indicator of a frequency of interactions between the user and the entity over another historical time period; and a fifth indicator of a number of technology-difficulty-related interactions between the user and the entity over the historical time period.

12. The computer program product of claim 10, wherein the non-transitory computer-readable medium comprises code causing the apparatus to, when determining the status of the relationship between the user and the entity, determine, based on the data associated with the interactions between the user and the entity, using the second artificial intelligence engine, and for each interaction of the interactions between the user and the entity, a nature of the interaction.

13. The computer program product of claim 12, wherein the nature of the interaction comprises at least one of positive, negative, neutral, technology-difficulty-related, or assistance-related.

14. The computer program product of claim 10, wherein the data associated with the plurality of interactions between the users and the entity comprises, for each interaction, a time of the interaction, a date of the interaction, a type of interaction, an amount of resources involved in the interaction, an account involved in the interaction, a payment instrument involved in the interaction, and a user associated with the entity involved in the interaction.

15. The computer program product of claim 14, wherein the type of interaction comprises at least one of in-person, phone-based, browser-based, application-based, automated-voice-interactive-based, chat-bot-based, transaction, inquiry, or request.

16. The computer program product of claim 10, wherein the apparatus comprises the user device, wherein the user device comprises a display, and wherein the non-transitory computer-readable medium comprises code causing the apparatus to, when causing the user device to display the graphical user interface, display the graphical user interface on the display.

17. The computer program product of claim 10, wherein the non-transitory computer-readable medium comprises code causing the apparatus to:

determine whether a first indicator of the plurality of indicators satisfies a threshold;

generate, in response to the first indicator satisfying the threshold, a notification; and provide the notification to a plurality of user devices associated with the entity.

18. A method for detecting attrition in a distributed network using artificial intelligence, the method comprising:

analyzing, in response to a user initiating an interaction with an entity, a database comprising data associated with a plurality of interactions between users and the entity to identify data associated with interactions between the user and the entity;

determining, in response to the user initiating the interaction, using a first artificial intelligence engine, and based on the data associated with the interactions between the user and the entity, a plurality of indicators of a relationship between the user and the entity, wherein the first artificial intelligence engine is configured to determine indicators of relationships between users and entities;

determining, based on the plurality of indicators, based on the data associated with the interactions between the user and the entity, and using a second artificial intelligence engine, a status of the relationship between the user and the entity, wherein the second artificial intelligence engine is configured to determine statuses of relationships between the users and the entities;

generating a graphical user interface comprising the plurality of indicators and another indicator of the status;

causing a user device of another user associated with the entity to display the graphical user interface to the other user while the user is performing the interaction with the entity;

updating, in real-time during the interaction between the user and the entity, using the first artificial intelligence engine, and based on new data generated in the database for the interaction, the plurality of indicators of the relationship between the user and the entity, wherein the new data comprises natural language data, and wherein the first artificial intelligence engine is configured to use natural language processing to parse the natural language data to update the plurality of indicators;

updating, in real-time during the interaction between the user and the entity, using the second artificial intelligence engine, and based on the new data generated in the database for the interaction, the status of the relationship between the user and the entity;

updating, in real-time during the interaction between the user and the entity, the graphical user interface to comprise the updated plurality of indicators and the updated status; and causing, in real-time during the interaction between the user and the entity, the user device of the other user associated with the entity to display the graphical user interface to the other user while the user is performing the interaction with the entity.

19. The method of claim 18, wherein the plurality of indicators comprises:

a first indicator of a number of positive interactions between the user and the entity over a historical time period;

a second indicator of a number of negative interactions between the user and the entity over the historical time period;

a third indicator of a total number of interactions between the user and the entity over the historical time period;

a fourth indicator of a frequency of interactions between the user and the entity over another historical time period; and a fifth indicator of a number of technology-difficulty-related interactions between the user and the entity over the historical time period.

20. The method of claim 18, comprising, when determining the status of the relationship between the user and the entity, determining, based on the data associated with the interactions between the user and the entity, using the second artificial intelligence engine, and for each interaction of the interactions between the user and the entity, a nature of the interaction.

\* \* \* \* \*